US009714542B1

(12) United States Patent
Harcz

(10) Patent No.: US 9,714,542 B1
(45) Date of Patent: Jul. 25, 2017

(54) LADDER STORAGE ASSEMBLY

(71) Applicant: Daniel John Harcz, Niles, MI (US)

(72) Inventor: Daniel John Harcz, Niles, MI (US)

( * ) Notice: Subject to any disclaimer, the term of this patent is extended or adjusted under 35 U.S.C. 154(b) by 0 days.

(21) Appl. No.: 15/212,960

(22) Filed: Jul. 18, 2016

(51) Int. Cl.
*E06C 7/14* (2006.01)
*F16M 13/02* (2006.01)

(52) U.S. Cl.
CPC ............ *E06C 7/14* (2013.01); *F16M 13/022* (2013.01)

(58) Field of Classification Search
CPC ................................ F16M 13/022; E06C 7/14
USPC ........................................................ 211/70.6
See application file for complete search history.

(56) References Cited

U.S. PATENT DOCUMENTS 1,243,732 A 10/1917 Goss
1,794,700 A * 3/1931 McCaskey ............... A47K 5/02 248/222.11
3,928,894 A * 12/1975 Bury ......................... B60R 1/04 24/304
4,212,371 A 7/1980 Gaviorno, Jr.
4,230,382 A * 10/1980 Wenzlick ........... A47B 88/0044 248/223.41
4,653,608 A 3/1987 Casada
4,653,713 A * 3/1987 Hamilton ................. B25H 3/02 182/129
4,662,594 A 5/1987 Dubis
4,874,147 A * 10/1989 Ory ........................... E06C 7/14 182/129
5,120,013 A 6/1992 Sweeney
5,240,214 A * 8/1993 Birnbaum ............ A47B 88/044 248/214
5,433,416 A * 7/1995 Johnson ............... B65D 23/003 248/475.1
5,622,278 A * 4/1997 Fries ......................... E06C 7/14 206/373
5,641,142 A 6/1997 Hanson et al.
D500,145 S 12/2004 Cromberg
7,000,876 B2 * 2/2006 Searcy ...................... E06C 7/14 108/42
8,453,796 B2 * 6/2013 Astor ........................ E06C 7/14 182/119
2004/0217241 A1 * 11/2004 Searcy ...................... E06C 7/14 248/210
2005/0258002 A1 * 11/2005 Sabo ......................... E06C 7/14 182/129
2007/0284191 A1 * 12/2007 Astor ........................ E06C 7/14 182/129
2012/0217093 A1 * 8/2012 Latimer .................... E06C 7/14 182/129
2013/0248288 A1 * 9/2013 Astor ........................ E06C 7/14 182/129
2016/0153235 A1 * 6/2016 Villar ........................ E06C 7/14 220/475
2016/0215561 A1 * 7/2016 Austin ...................... E06C 7/14

FOREIGN PATENT DOCUMENTS

EP 0396140 5/1990

* cited by examiner

Primary Examiner — Korie H Chan

(57) ABSTRACT

A ladder storage assembly for storing tools on a ladder includes a saddle that may be removably coupled to a top step of a ladder. A tray is removably coupled to the saddle. Thus, the tray is secured to the ladder. The tray may contain a plurality of tools thereby facilitating the tools to be accessible from the ladder.

11 Claims, 4 Drawing Sheets

LADDER STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to storage devices and more particularly pertains to a new storage device for storing tools on a ladder.

BRIEF SUMMARY OF THE INVENTION

An embodiment of the disclosure meets the needs presented above by generally comprising a saddle that may be removably coupled to a top step of a ladder. A tray is removably coupled to the saddle. Thus, the tray is secured to the ladder. The tray may contain a plurality of tools thereby facilitating the tools to be accessible from the ladder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
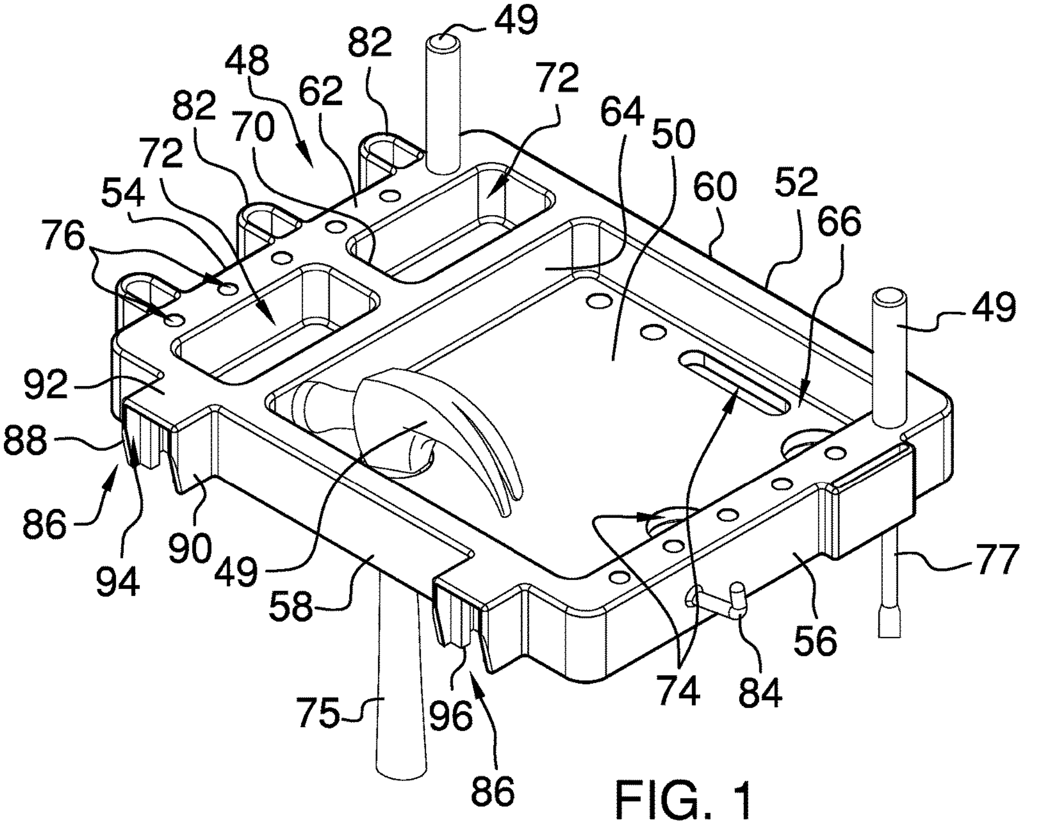
FIG. 1 is a top perspective view of tray of a ladder storage assembly according to an embodiment of the disclosure.
Figure 2:
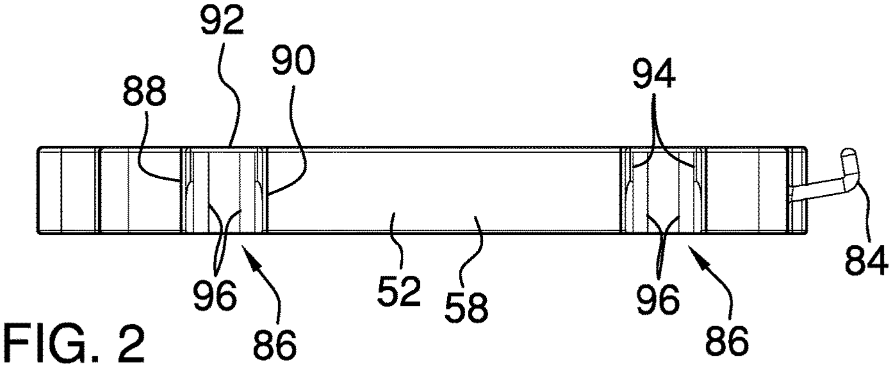
FIG. 2 is a front view of tray of an embodiment of the disclosure.
Figure 3:
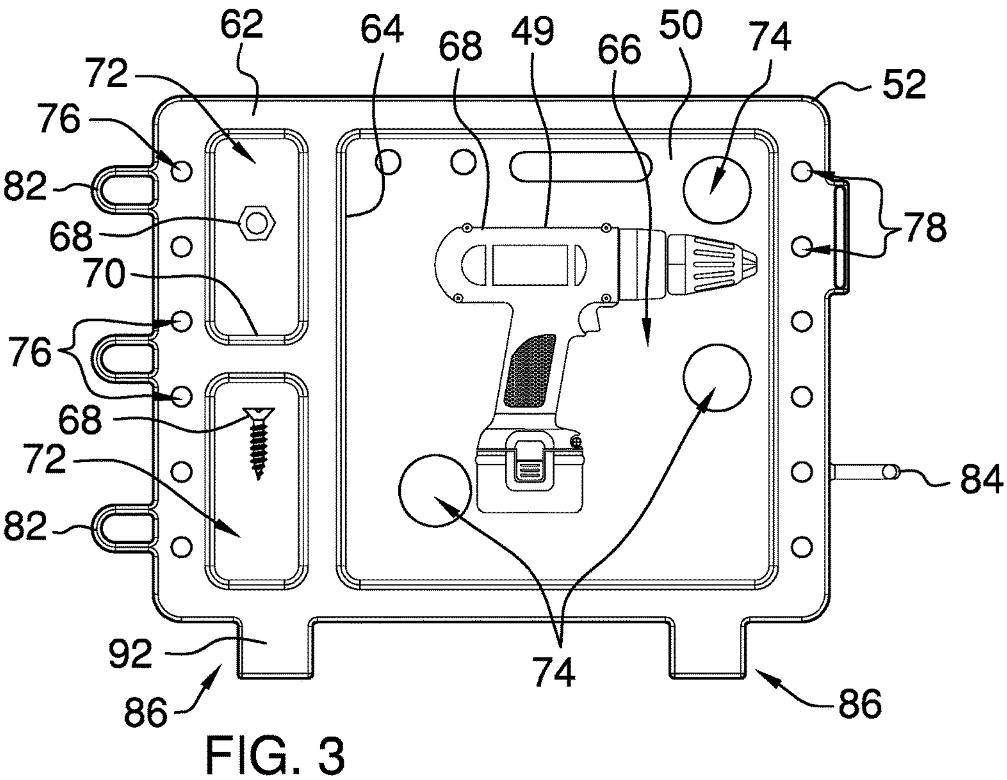
FIG. 3 is a top view of an embodiment of the disclosure.
Figure 4:
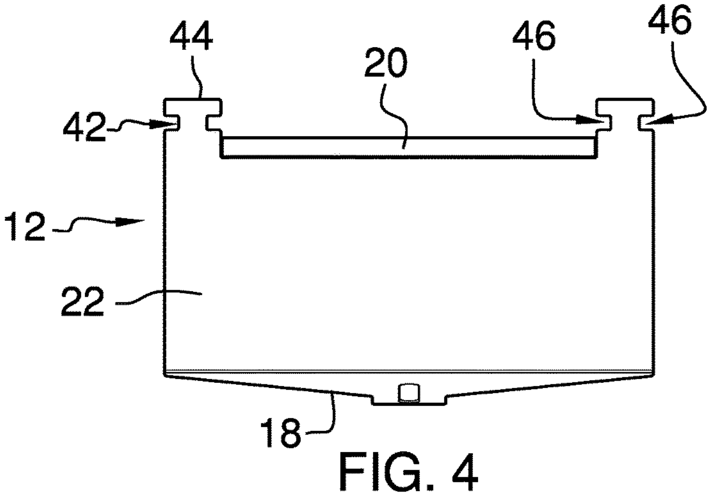
FIG. 4 is a top view of a saddle of an embodiment of the disclosure.
Figure 5:
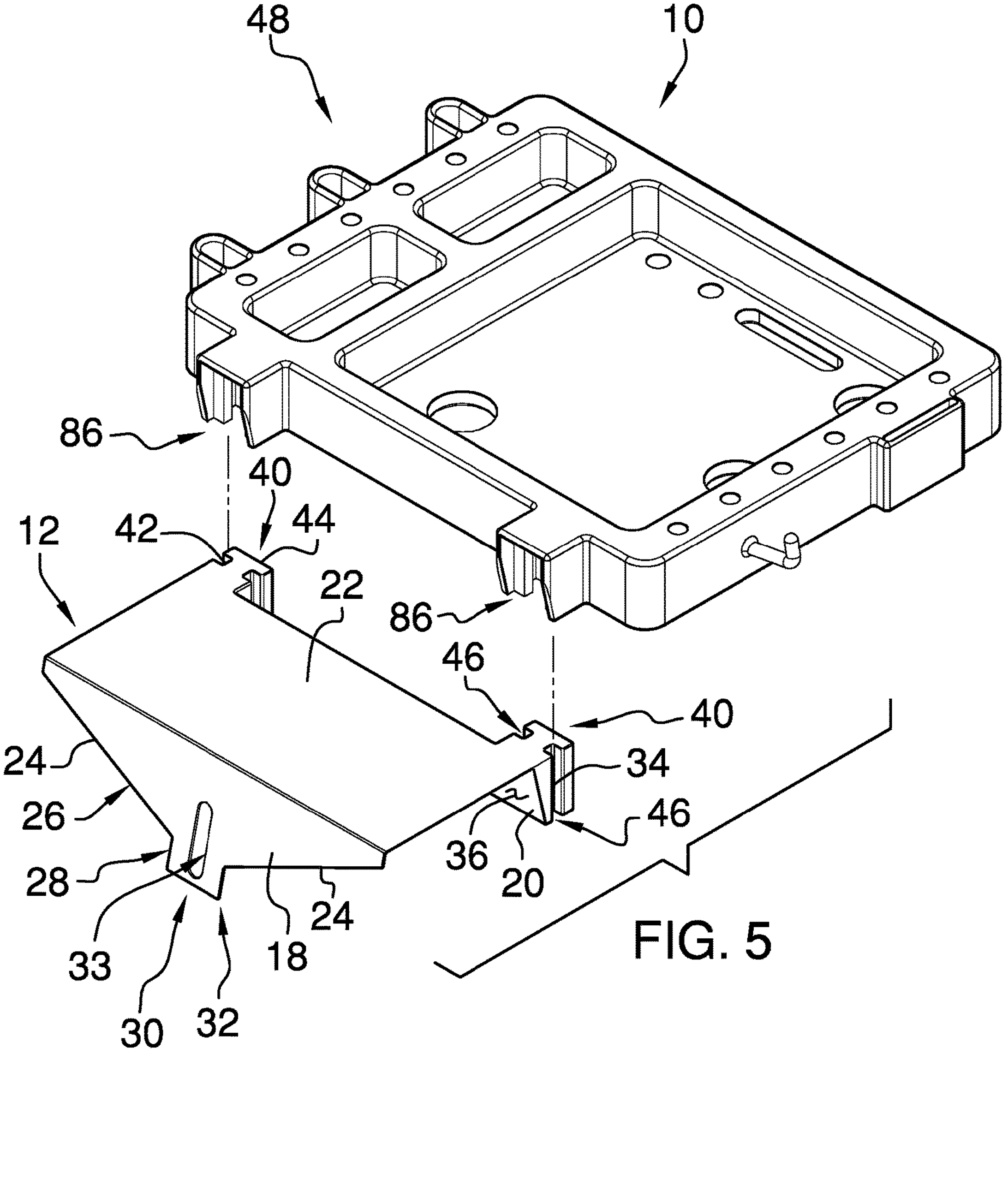
FIG. 5 is a perspective view of an embodiment of the disclosure.
Figure 6:
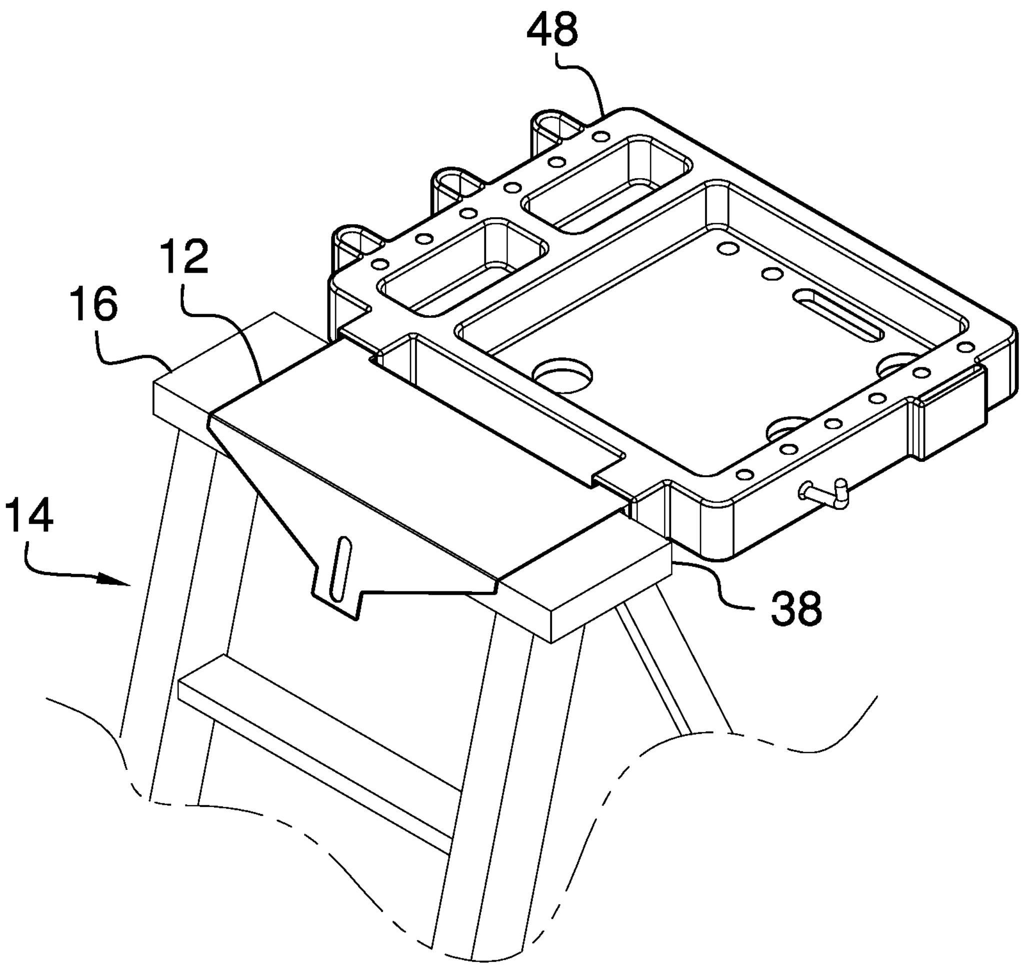
FIG. 6 is a perspective in-use view of an embodiment of the disclosure.

With reference now to the drawings, and in particular to FIGS. 1 through 6 thereof, a new storage device embodying the principles and concepts of an embodiment of the disclosure and generally designated by the reference numeral 10 will be described.

As best illustrated in FIGS. 1 through 6, the ladder storage assembly 10 generally comprises a saddle 12. The saddle 12 may be removably coupled to a top step 14 of a ladder 16. The ladder 16 may be a step ladder 16 or the like. The saddle 12 has a first end portion 18, a second end portion 20 and a central portion 22 extending therebetween. Each of the first and second end portions extends downwardly from the central portion 22.

The first end portion 18 has a pair of lateral edges 24, and each of the lateral edges 24 has an angled section 26 and a vertical section 28. The angled section 26 corresponding to each of the lateral edges 24 angles downwardly from the central portion 22. The vertical section 28 corresponding to each of the lateral edges 24 is spaced from a center 30 of the first end portion 18 to define a tab 32. The first end portion 18 has a slot 33 extending therethrough. The slot 33 is centrally positioned on the first end portion 18. The slot 33 extends upwardly on the tab 32 toward the central portion 22.

The second end portion 20 has an outwardly facing surface 34 and an inwardly facing surface 36. The central portion 22 rests on the top step 14 of the ladder 16. The inwardly facing surface 36 of the second end portion 20 abuts a back side 38 of the ladder 16. Thus, the central portion 22 is inhibited from tipping upwardly on the top step 14.

A pair of mounts 40 is provided. Each of the mounts 40 extends away from the outwardly facing surface 34 of the second end portion 20. The mounts 40 are spaced apart from each other, and each of the mounts 40 includes a stem 42 and a head 44. The stem 42 corresponding to each of the mounts 40 extends away from the outwardly facing surface 34. The head 44 corresponding to each of the mounts 40 is oriented transverse with respect to the stem 42 of the corresponding mount. The head 44 is spaced from the outwardly facing surface 34 to define a pair of spaces 46 corresponding to each of the mounts 40.

A tray 48 is provided and the tray 48 is removably coupled to the saddle 12 thereby securing the tray 48 to the ladder 16. The tray 48 may contain a plurality of tools 49 thereby facilitating the tools 49 to be accessible from the ladder 16. The tools 49 may be hand tools 49 and power tools 49.

The tray 48 has a bottom wall 50 and a peripheral wall 52 extending upwardly therefrom. The peripheral wall 52 has a first lateral side 54, a second lateral side 56, a back side 58 and a front side 60. The peripheral wall 52 has a distal edge 62 with respect to the bottom wall 50. The tray 48 has a first divider 64 extending between the front side 60 and the back side 38. The first divider 64 defines a first well 66 in the tray 48 to contain objects 68. The first divider 64 is positioned closer to the first lateral side 54 than the second lateral side 56. The peripheral wall 52 inhibits the tools 49 and the objects 68 from sliding off of the tray 48.

The tray 48 has a second divider 70 extends between the first lateral side 54 and the second divider 70. The second divider 70 defines a pair of second wells 72 to contain objects 68. The second divider 70 is centrally positioned on the tray 48. The bottom wall 50 has a plurality of openings 74 extending therethrough. A handle 75 of the tools 49 may be extended through each of the openings 74. Each of the openings 74 is positioned in the first well 66 and the openings 74 are spaced apart from each other.

The first lateral side 54 of the peripheral wall 52 has a plurality of first apertures 76 extending downwardly therethrough. Stems 77 of tools 49 may be extended through each of the first apertures 76 such as screwdrivers or the like. The first apertures 76 are spaced apart from each other. Moreover, the first apertures 76 are distributed along the first lateral side 54.

The second lateral side 56 of the peripheral wall 52 has a plurality of second apertures 78 extending downwardly therethrough. Each of the second apertures 78 may have stems 77 of tools 49 extended therethrough. The second apertures 78 are spaced apart from each other. Moreover, the second apertures 78 are distributed along the second lateral side 56.

Each of the first lateral side 54, the second lateral side 56 and the back side 38 has an exterior surface 80. The tray 48 includes a plurality of loops 82. Each of the loops 82 extends outwardly from the exterior surface 80 of the first lateral side 54. Thus, each of the loops 82 may have the stem 77 of the tools 49 extended therethrough. A hook 84 extends outwardly from the exterior surface 80 corresponding to the second lateral side 56 to support an object.

A pair of retainers 86 is provided. Each of the retainers 86 is coupled to and extends outwardly from the exterior surface 80 corresponding to the back side 38 of the tray 48. The retainers 86 are spaced apart from each other and are distributed on the back side 38. Each of the retainers 86 engages an associated one of the mounts 40. Thus, the tray 48 is removably coupled to the saddle 12.

Each of the retainers 86 comprises a first wall 88, a second wall 90 and a third wall 92 extending therebetween. The first wall 88 and the second wall 90 are spaced apart from each other. Each of the first wall 88 and the second wall 90 has an interior facing surface 94. Each of the first wall 88 and the second wall 90 extends downwardly along the tray 48.

A pair of holders 96 is provided. Each of the holders 96 extends inwardly from the interior facing surface 94 of an associated one of the first wall 88 and the second wall 90. Each of holders 96 is vertically coextensive with the associate first wall 88 and the second wall 90. Each of the holders 96 slidably engages an associated one of the spaces 46 on an associated one of the mounts 40. The third wall 92 corresponding to each of the retainers 86 abuts the associated mount. Thus, the tray 48 is removably coupled to the saddle 12.

In use, the saddle 12 is positioned on the top step 14 of the ladder 16 having the inwardly facing surface 36 of the second end portion 20 abutting the back side 38 of the ladder 16. Additionally, each of the mounts 40 is directed away from the back side 38 of the ladder 16. The tray 48 is manipulated to facilitate each of the retainers 86 to engage an associated one of the mounts 40. Thus, the tray 48 is removably coupled to the ladder 16. The objects 68 and the tools 49 are positioned in the tray 48 at selected locations. The peripheral wall 52 inhibits the tools 49 and objects 68 from sliding off of the tray 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ladder storage assembly being configured to store tools on a ladder, said assembly comprising:

a saddle being configured to be removably coupled to a top step of a ladder; and a tray being removably coupled to said saddle wherein said tray is configured to be secured to the ladder, said tray being configured to contain a plurality of tools thereby facilitating the tools to be accessible from the ladder;

wherein said tray has a bottom wall and a peripheral wall extending upwardly therefrom, said peripheral wall having a first lateral side, a second lateral side, a back side and a front side, said peripheral wall having a distal edge with respect to said bottom wall, said tray having a first divider extending between said front side and said back side to define a first well in said tray wherein said first well is configured to contain objects, said first divider being positioned closer to said first lateral side than said second lateral side, said tray having a second divider extending between said first lateral side and said second divider to define a pair of second wells wherein each of said second wells is configured to contain objects, said second divider being centrally positioned on said tray;

a pair of mounts, each of said mounts being coupled to said saddle;

a pair of retainers, each of said retainers being coupled to and extending outwardly from an exterior surface corresponding to said back side of said tray, said retainers being spaced apart from each other and being distributed on said back side, each of said retainers engaging an associated one of said mounts such that said tray is removably coupled to said saddle, wherein each of said retainers comprises a first wall, a second wall and a third wall extending therebetween, said first wall and said second wall being spaced apart from each other, each of said first wall and said second wall having an interior facing surface; and a pair of holders, each of said holders extending inwardly from said interior facing surface of an associated one of said first wall and said second wall, each of holders being vertically coextensive with said associate first wall and said second wall, each of said holders slidably engaging an associated one of said spaces on an associated one of said mounts having said third wall abutting said associated mount such that said tray is removably coupled to said saddle.

2. The assembly according to claim 1, wherein said saddle has a first end portion, a second end portion and a central portion extending therebetween, each of said first and second end portions extending downwardly from said central portion, said first end portion having a pair of lateral edges and a tab, said tab being centrally positioned on said first end portion.

3. The assembly according to claim 2, wherein each of said lateral edges angles downwardly between said central portion and said tab, said first end portion having a slot extending therethrough, said slot being centrally positioned on said first end portion, said slot extending upwardly on said tab toward said central portion.

4. The assembly according to claim 2, wherein said second end portion has an outwardly facing surface and an inwardly facing surface, said central portion being configured to rest on the top step of the ladder, said inwardly facing surface being configured to abut a back side of the ladder thereby inhibiting said central portion from tipping upwardly on the top step.

5. The assembly according to claim 4, further comprising a pair of mounts, each of said mounts extending away from said outwardly facing surface of said second end portion, said mounts being spaced apart from each other, each of said mounts including a stem and a head, said stem corresponding to each of said mounts extending away from said outwardly facing surface, said head corresponding to each of said mounts being oriented transverse with respect to said stem of said corresponding mount, said head being spaced from said outwardly facing surface to define a pair of spaces corresponding to each of said mounts.

6. The assembly according to claim 1, wherein said bottom wall has a plurality of openings extending therethrough wherein each of said openings is configured to have a handle of a tool extended therethrough, each of said openings being positioned in said first well, said openings being spaced apart from each other.

7. The assembly according to claim 1, wherein said first lateral side of said peripheral wall has a plurality of first apertures extending downwardly therethrough wherein each of said first apertures is configured to have stems of tools extended therethrough, said first apertures being spaced apart from each other and being distributed along said first lateral side.

8. The assembly according to claim 1, wherein said second lateral side of said peripheral wall has a plurality of second apertures extending downwardly therethrough wherein each of said second apertures is configured to have stems of tools extended therethrough, said second apertures being spaced apart from each other and being distributed along said second lateral side.

9. The assembly according to claim 1, wherein each of said first lateral side, said second lateral side and said back side having said exterior surface, said tray having a plurality of loops, each of said loops extending outwardly from said exterior surface of said first lateral side wherein each of said loops is configured to have a stem of a tool extended therethrough.

10. The assembly according to claim 1, wherein said tray has a hook extending outwardly from said exterior surface corresponding to said second lateral side wherein said hook is configured to support an object.

11. A ladder storage assembly being configured to store tools on a ladder, said assembly comprising:

a saddle being configured to be removably coupled to a top step of a ladder, said saddle having a first end portion, a second end portion and a central portion extending therebetween, each of said first and second end portions extending downwardly from said central portion, said first end portion having a pair of lateral edges, each of said lateral edges having an angled section and a vertical section, said angled portion corresponding to each of said lateral edges angling downwardly from said central portion, said vertical section corresponding to each of said lateral edges being spaced from a center of said first end portion to define a tab, said first end portion having a slot extending therethrough, said slot being centrally positioned on said first end portion, said slot extending upwardly on said tab toward said central portion, said second end portion having an outwardly facing surface and an inwardly facing surface, said central portion being configured to rest on the top step of the ladder, said inwardly facing surface being configured to abut a back side of the ladder thereby inhibiting said central portion from tipping upwardly on the top step;

a pair of mounts, each of said mounts extending away from said outwardly facing surface of said second end portion, said mounts being spaced apart from each other, each of said mounts including a stem and a head, said stem corresponding to each of said mounts extending away from said outwardly facing surface, said head corresponding to each of said mounts being oriented transverse with respect to said stem of said corresponding mount, said head being spaced from said outwardly facing surface to define a pair of spaces corresponding to each of said mounts;

a tray being removably coupled to said saddle wherein said tray is configured to be secured to the ladder, said tray being configured to contain a plurality of tools thereby facilitating the tools to be accessible from the ladder, said tray having a bottom wall and a peripheral wall extending upwardly therefrom, said peripheral wall having a first lateral side, a second lateral side, a back side and a front side, said peripheral wall having a distal edge with respect to said bottom wall, said tray having a first divider extending between said front side and said back side to define a first well in said tray wherein said first well is configured to contain objects, said first divider being positioned closer to said first lateral side than said second lateral side, said tray having a second divider extending between said first lateral side and said second divider to define a pair of second wells wherein each of said second wells is configured to contain objects, said second divider being centrally positioned on said tray, said bottom wall having a plurality of openings extending therethrough wherein each of said openings is configured to have a handle of a tool extended therethrough, each of said openings being positioned in said first well, said openings being spaced apart from each other, said first lateral side of said peripheral wall having a plurality of first apertures extending downwardly therethrough wherein each of said first apertures is configured to have stems of tools extended therethrough, said first apertures being spaced apart from each other and being distributed along said first lateral side, said second lateral side of said peripheral wall having a plurality of second apertures extending downwardly therethrough wherein each of said second apertures is configured to have stems of tools extended therethrough, said second apertures being spaced apart from each other and being distributed along said second lateral side, each of said first lateral side, said second lateral side and said back side having an exterior surface, said tray having a plurality of loops, each of said loops extending outwardly from said exterior surface of said first lateral side wherein each of said loops is configured to have a stem of a tool extended therethrough, said tray having a hook extending outwardly from said exterior surface corresponding to said second lateral side wherein said hook is configured to support an object; and a pair of retainers, each of said retainers being coupled to and extending outwardly from said exterior surface corresponding to said back side of said tray, said retainers being spaced apart from each other and being distributed on said back side, each of said retainers engaging an associated one of said mounts such that said tray is removably coupled to said saddle, each of said retainers comprising:

a first wall, a second wall and a third wall extending therebetween, said first wall and said second wall being spaced apart from each other, each of said first wall and said second wall having an interior facing surface, and a pair of holders, each of said holders extending inwardly from said interior facing surface of an associated one of said first wall and said second wall, each of holders being vertically coextensive with said associate first wall and said second wall, each of said holders slidably engaging an associated one of said spaces on an associated one of said mounts having said third wall abutting said associated mount such that said tray is removably coupled to said saddle.

* * * * *